S. DUSTIN.
Improvement in Steam-Boiler Floats.
No. 129,885.  Patented July 30, 1872.
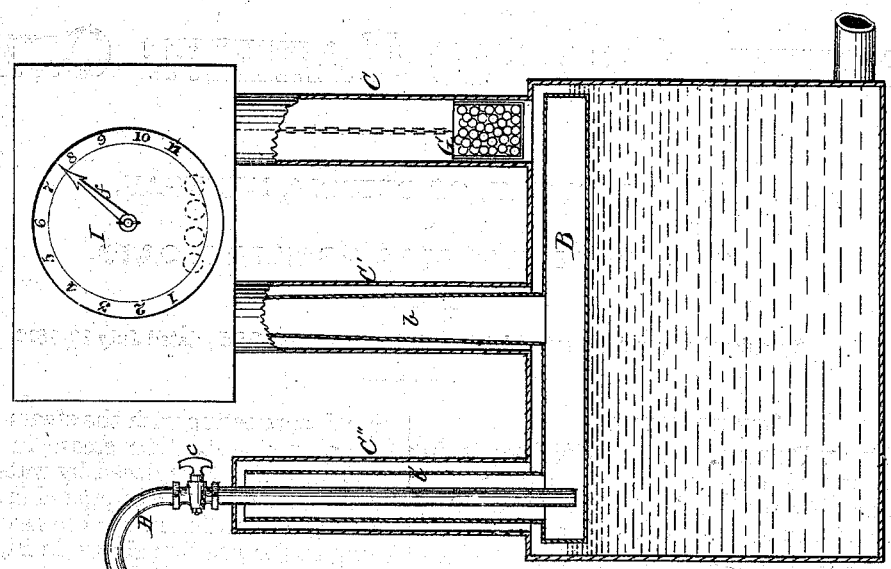
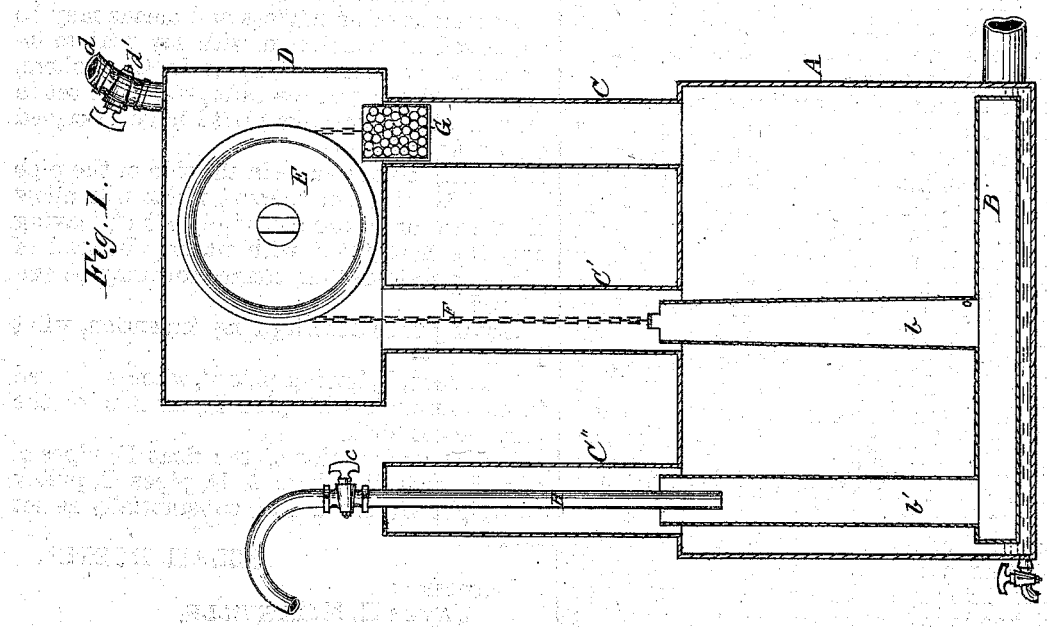
Witnesses: James H. Mandeville. O. E. Duffy
Inventor: Selah Dustin

UNITED STATES PATENT OFFICE.

SELAH DUSTIN, OF DETROIT, MICHIGAN.

IMPROVEMENT IN STEAM-BOILER FLOATS.

Specification forming part of Letters Patent No. 129,885, dated July 30, 1872.

SPECIFICATION.

I, SELAH DUSTIN, of the city of Detroit, in the county of Wayne and State of Michigan, have invented certain Improvements in "Steam-Boiler Floats;" and my invention consists of a shallow hollow float, to which is attached an upright pipe, into which a small pipe enters, by which the sediment and mud are blown out of said float, all of which will be more fully described in the following specification, reference being had to the accompanying drawing, in which—

Figure 1 is a vertical section of my apparatus with the float at low water. Fig. 2 is a vertical section of the same at high water.

In the drawing, A represents a chamber, in which is placed the float B. This float when in use is filled with water. To the upper part of chamber A are attached two pipes, C C', connecting to a smaller chamber or case, D, in which revolves a sheave or grooved pulley, E, on a suitable shaft and bearings. Over the pulley E passes a chain or cord, F, attached at one end by a bail to an open pipe, b, (which steadies and guides the float,) and the other end to a counterpoise-weight, G. The float is provided with another pipe or stem, b', which also assists as a guide, and passes up into the standing pipe C'', that is closed at the top, and secured to which is a small steam-pipe, H, provided with a small cock, c. The pipe H enters the center of pipe b'. When it is desired to blow the sediment and mud out of the float, the cock d' in the pipe d, connecting with the steam-space of the boiler, is closed. The steam in chamber A condenses and is replaced by water, when the small cock or valve c in pipe H is opened, and the dirt and sediment are blown out, the float being in the position shown in Fig. 2.

I have shown a dial, I, with suitable numbers, and a hand, f, connected to my float, to show the amount of water in the boiler.

Numerous other devices and means may be employed in connection with my float to indicate the amount of water in the boilers, sound an alarm, raise a safety-valve, or set in motion a feed-pump, &c.; but I have described only a few of these.

A small hole is made in the side of the pipe b, near the bottom thereof, which will allow all the water to run out of pipes b b', leaving only the float filled with water. Instead of pipe b, a rod or other connection may be employed.

Having thus described my invention, what I claim is—

1. A float, B, having pipe b', when arranged in combination with pipe H, as and for the purpose set forth.

2. The combination of the float B, pipes b' and H, with chambers A D, pipes C, pulley E, weight G, and a dial, substantially as set forth.

SELAH DUSTIN.

Witnesses:
JAMES H. MANDEVILLE,
O. E. DUFFY.